US009144101B2

(12) United States Patent
Ekici et al.

(10) Patent No.: US 9,144,101 B2
(45) Date of Patent: Sep. 22, 2015

(54) APPARATUS AND METHOD FOR WIRELESS DEVICE CONNECTIVITY UPON RADIO LINK FAILURE

(71) Applicant: Broadcom Corporation, Irvine, CA (US)

(72) Inventors: Ozgur Ekici, San Diego, CA (US); Ahmed Arsalan, Carlsbad, CA (US)

(*) Notice: Subject to any disclaimer, the term of this patent is extended or adjusted under 35 U.S.C. 154(b) by 0 days.

(21) Appl. No.: 14/042,006

(22) Filed: Sep. 30, 2013

(65) Prior Publication Data

US 2014/0099953 A1 Apr. 10, 2014

Related U.S. Application Data

(60) Provisional application No. 61/710,561, filed on Oct. 5, 2012.

(51) Int. Cl.
*H04W 4/00* (2009.01)
*H04W 76/02* (2009.01)

(52) U.S. Cl.
CPC .................................. *H04W 76/028* (2013.01)

(58) Field of Classification Search
CPC ... H04W 76/00; H04W 76/007; H04W 76/02; H04W 76/022; H04W 76/025; H04W 76/026; H04W 76/027; H04W 76/028; H04W 76/04; H04W 74/041; H04W 76/043; H04W 76/045; H04W 76/046
See application file for complete search history.

(56) References Cited

U.S. PATENT DOCUMENTS

2010/0304736 A1* 12/2010 Konda et al. .................. 455/424

OTHER PUBLICATIONS

"CRs to Rel-4 on Work Item GPRS," 3GPP TSG CN Plenary, Meeting #11, Palm Springs, U.S.A., Mar. 14-16, 2001; 17 pages.

* cited by examiner

*Primary Examiner* — Ronald Eisner
(74) *Attorney, Agent, or Firm* — Sterne, Kessler, Goldstein & Fox P.L.L.C.

(57) ABSTRACT

An apparatus and method for improving the connectivity when a radio link failure occurs is disclosed. The method includes detecting, by a user equipment (UE), a radio link failure to a first radio network controller (RNC) and receiving an information message from a second RNC. The method further includes determining whether the first and second RNCs have interface connectivity between them. If the first and second RNCs have interface connectivity between them, performing a connection recovery procedure with the second RNC. However, if the first and second RNCs do not have interface connectivity between them, performing an initial connection procedure to establish a connection with the second RNC without performing a connection recovery procedure.

20 Claims, 6 Drawing Sheets

APPARATUS AND METHOD FOR WIRELESS DEVICE CONNECTIVITY UPON RADIO LINK FAILURE

CROSS REFERENCE TO RELATED APPLICATIONS

The present application claims priority to U.S. Provisional Patent Application No. 61/710,561, filed on Oct. 5, 2012, which is hereby expressly incorporated by reference in its entirety.

BACKGROUND

1. Field

The present disclosure relates generally to a method for improving connectivity of wireless devices, and more specifically, improving the connectivity when a radio link failure occurs.

2. Background Art

The Radio Network Controller (or RNC) is a governing element in a Universal Mobile Telecommunications System (UMTS) radio access network (UTRAN), and is responsible for controlling, evolved Nodes (eNode Bs) that are connected to it. The RNC carries out radio resource management, some of the mobility management functions and is the point where encryption is done before user data is sent to and from the mobile subscriber. The RNC can also connect to the Circuit Switched Core Network through Media Gateway (MGW) and to the SGSN (Serving GPRS Support Node) in the Packet Switched Core Network.

In wireless networks, such as Wideband Code Division Multiple Access (WCDMA)/UMTS networks, it is possible that the RNCs do not have an interface connectivity between them. For example, in a UTRAN, there are four possible interfaces for connecting the UTRAN internally or externally to other functional entities. One of these interfaces is Iur interface connectivity for connection between RNCs. It is possible that two or more RNCs in a UTAN do not have the Iur connectivity between them.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and to enable a person skilled in the relevant art(s) to make and use the disclosure.

The present disclosure will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Overview

When a user equipment (UE) establishes a connection to a first RNC on the first RNC's cell border area and later the UE experiences a radio link failure, it is possible that the UE will select another cell that belongs to a second RNC for connection recovery. In this case, if there is no interface connectivity between the first and second RNCs, the second RNC, does not recognize the UE when the UE tries to recover its connection. The UE will try a connection recovery procedure before it goes back to an idle mode and tries to establish a new connection. Depending on the network configuration, the UE's connection recovery will take some time before the UE tries an initial connection procedure. During this time, the UE will be unreachable and will be considered in a virtually out-of-service state, where the UE will neither be able to receive/place a voice call nor have data connectivity.

Apparatuses and methods are provided to improve the connectivity of wireless devices when a radio link failure occurs. According to an embodiment of the disclosure, a an apparatus and method are provided that include detecting, by a user equipment (UE), a radio link failure to a first radio network controller (RNC) and receiving an, information message from a second RNC. The apparatus and method further include determining whether the first and second RNCs have interface connectivity between them. If the first and second RNCs have interface connectivity between them, then performing a connection recovery procedure with the second RNCs. However, if the first and second RNCs do not have interface connectivity between them, then the apparatus and method performs an initial connection procedure to establish a connection with the second RNC, without performing a connection recovery procedure beforehand.

Detailed Discussion

The following Detailed Description of the present disclosure refers to the accompanying drawings that illustrate exemplary embodiments consistent with this disclosure. The exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein. Therefore, the detailed description is not meant to limit the present disclosure.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the disclosure may be implemented in hardware, firmware, software, or any combination thereof. Embodiments of the disclosure may also be implemented as instructions stored, on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, the term "module" and the like, shall be understood to include at least one of software, firmware, and hardware (such as, one or more circuits, microchips, processors, or devices, or any combination thereof), and any combination thereof In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Figure 1:
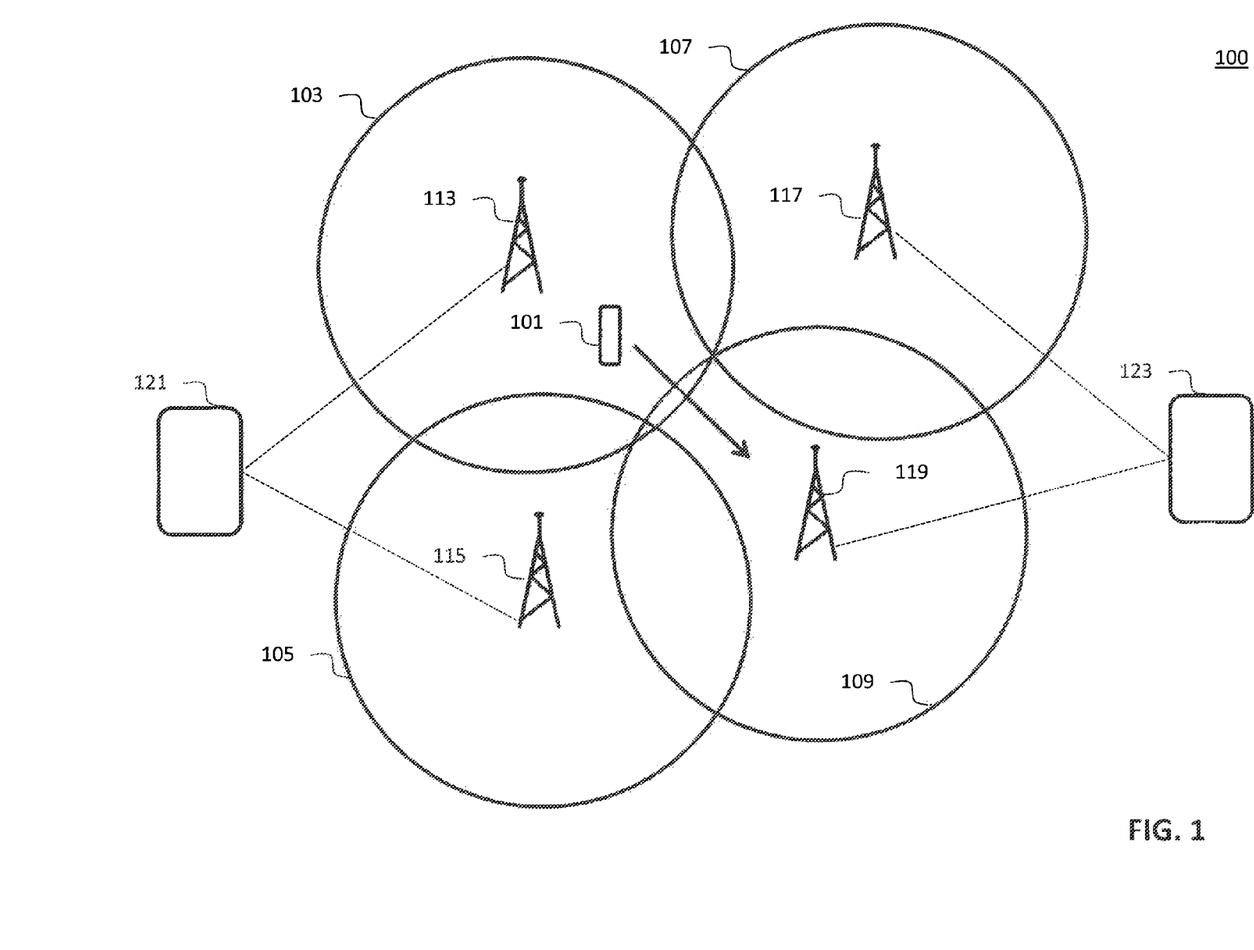
FIG. 1 illustrates a system, in accordance with an embodiment of the present disclosure.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms may be utilized interchangeably in the subject specification and related drawings. Likewise, the terms "access point," "base station," "base transceiver station", "Node B," "evolved Node B (eNode B)," home Node B (HNB)," "home access point (HAP)," or the like, may be utilized interchangeably in the subject specification and drawings, and refer to a wireless network component or apparatus that serves and receives data, control, voice, video, sound, gaming, or substantially any data-stream or signaling-stream from a set of subscriber stations FIG. 1 illustrates a system 100, according to an embodiment of the present disclosure. For example, system 100 illustrates user equipment (UE) 101 that communicates with base station (BS) 113, such as an eNode B or the like, in cell area 103. In one example, UE 101 can be, but is not limited to, a mobile phone, smartphone, personal digital assistant (PDA), etc.

According to the exemplary embodiment of FIG. 1, BS 113 covers cell area 103 and BS 115 covers cell area 105. In this example, BSs 113 and 115 are controlled by RNC 121. Similarly, BS 117 and 119, which cover cell areas 107 and 109, respectively, are controlled by RNC 123. In an exemplary and non-limiting embodiment, RNCs 121 and 123 are governing elements in the UMTS radio access network (UTRAN) and are responsible for controlling BSs that are connected to them. As one example, the RNCs 121 and 123 can carry out radio resource management, mobility management, etc. According to this example, the RNCs 121 and 123 do not have any interface connectivity between them, such as an Iur interface that can be used for soft handovers.

Such an implementation is especially common in a Femtocell scenario, where eNode-B and RNC functionality are incorporated into a small transceiver, which is typically a different RNC than that of surrounding Macro cells. An Iur interface is also typically absent when a network operator deploys network equipment from multiple different infrastructure vendors in their network, such that one or more BS cannot communicate with each other.

According to the exemplary embodiment of FIG. 1, UE 101 can collect necessary information from the network regarding the surrounding RNCs, the cells belonging to different RNCs, and whether the RNCs have interface connectivity between them. Considering such a network configuration. UE 101, upon experiencing a radio link failure and selecting a new cell on a new RNC, can intentionally skip connection recovery (e.g., connection re-establishment procedure such as cellUpdate procedure) that is normally required as per standards, and therefore can minimize the duration that the UE 101 is unreachable. In one example, the time duration that UE 101 is unreachable can be reduced from around 56 seconds, when connection recovery is attempted, to around 2-3 seconds.

For example, UE 101, which can be on the border of cell area 103 associated with BS 113, and has a connection with BS 113. BS 113 is controlled by RNC 121. According to this example, UE 101 is also located close to the border of cell 109, which is associated with BS 119, which is controlled by RNC 123. Continuing with this example, UE 101 is able to collect information (during its regular connected mode of operation) to determine whether RNCs 121 and 123 have interface connectivity between them. According to one embodiment, during regular connected mode of operation of UE 101 and in mobility scenarios. UE 101 can receive messages in the connected mode indicating that UE 101 should perform initial connection procedures (such as Location Area Update (LAU) procedure, Routing Area Update (RAU) procedure, and/or the like defined in a communications standard) in a new cell belonging to a new RNC. For example, while UE 101 is connected to RNC 121 through BS 113, UE 101 can receive messages from BS 113 and/or BS 119 indicating the UE 101 should perform initial connection procedures for a new cell belonging to RNC 123. UE 101 can use this information to conclude that RNCs 121 and 123 do not have interface connectivity between them because a handover was not attempted by the first RNC and/or its associated BS to the second RNC and or its associated BS, instead of the longer initial connection procedure.

According to another example, if RNCs 121 and 123 do not have interface connectivity between them and UE 101 is moving from cell 103 (associated with RNC 121) to cell 109 (associated with RNC 123), RNC 121 will notify UE 101 that it cannot hand over UE 101 to RNC 123. Accordingly, RNC 121 will ask UE 101 to release its connection with RNC 121 and re-establish its connection with RNC 123. In this case, without any radio link failure, UE 101 disconnects from RNC 121 and connects to RNC 123 using the initial connection procedure. With this experience, the UE 101 cam understand that RNCs 121 and 123 do not have interface connectivity between them, because RNC 121 did not attempt a handover of UE 101 to RNC 123, instead of using the more burdensome initial connection procedure. Stated another way, the inability of two RNCs to perform a planned hand-over, can be used by the UE to conclude that there is no interface between two RNCs and their corresponding BS.

In one example where 3rd Generation Partnership Project (3GPP) standards are used, in the mobility scenario discussed above, UE 101 will receive *rccConnectionRelease* and *releaseCause:directedsignallingconnectionre-establishment* messages from RNC 121, where RNC 121 will ask UE 101 to release its connection with RNC 121 and re-establish its connection with RNC 123. Herein, it is noted that messages associated with a specific standard are shown in italic for identification purposes. It is understood that these messages are within the knowledge of one skilled in the art familiar with these standards. Further, the 3rd Generation Partnership Project (3GPP) standard is incorporated herein by reference.

In addition to the specific examples provided above, UE 101 can collect information on whether RNCs 121 and 123 have interface connectivity between them using other techniques, as will be understood by those skilled in arts based on the discussion given herein.

Continuing with the exemplary embodiment of FIG. 1, UE 101 is connected to RNC 121 through BS 113, UE 101 has collected information regarding RNCs 121 and 123 and cell areas 103 and 109, and UE 101 has the information that RNCs 121 and 123 do not have interface connectivity. With this knowledge, when UE 101 experiences a radio link failure with BS 113 (for example because of its movement toward cell area 109 and BS 119 and therefore out of range of BS 113), UE 101 can skip the connection recovery procedure that is normally required by the network configuration and its corresponding standards. Instead, the UE can immediately perform an initial connection procedure.

The following discussion is provided to compare and contrast a connection recovery procedure and an, initial connection procedure. According to one example where 3GPP standards are used for the network, connection recovery procedure includes cellUpdate procedure with cause code radioLinkFailure. According to this example, after selecting the new cell, UE 101 will send cellUpdate messages to the new BS (e.g., BS 119 associated with RNC 123) with cause code radioLinkFailure and the UE identifier, which has been assigned to UE 101 by the prior serving RNC (e.g., RNC 121). If there is interface connectivity between RNC 121 and 123, then the cellUpdate messages and UE ID should enable the RNC 123 to recover the connection with UE 101 per standard procedures, without requiring the UE to perform the initial connection procedure. If RNCs 121 and 123 do not have interface connectivity, RNC 123 will not recognize UE 101 and will not respond to UE with cellUpdateConfirm message allocating radio resources for connection re-establishment. Depending on the network configuration and the standards, UE 101 will repeat the cellUpdate procedure for a predetermined number of times with a fixed time interval between each attempt. In one example, the configuration is defined in Information Block Type1 (repeat cellUpdate procedure for N302 times with T302 duration in between.) After a timeout, the UE will enter an idle mode, and will be generally unavailable until an initial connection is established with a new RNC.

According to this example where 3GPP standards are used for the network, initial connection procedure includes initiating Location Area Update (LAU) and Routing Area Update (RAU) procedures and or requests. In this example, after detecting the radio link failure and transitioning to an idle state, UE 101 will send LAU and RAU requests to the new BS (e.g., BS 119 associate with RNC 123) to establish a new connection with the new RNC.

Stated, another way, connection recovery procedure is performed when a UE tries to re-establish the connection it has lost, using information from the prior connection such at assigned UE ID. If UE tries to re-establish its connection with its prior RNC or with another RNC that can recognize the UE, then the connection recovery procedure is a faster process when compared with establishing a new connection with an RNC using the initial connection procedure. The initial connection procedure is a process for the UE to establish a connection with the RNC, as if it is the first time and no prior connection information is available.

According to one example, performing connection recovery procedure when UE 101 (which was connected to RNC 121 through BS 113) has moved to new cell area 109 (associated with RNC 123) and has experienced radio link failure with BS 113 (and/or RNC 121) will waste time because RNC 123 does not recognize UE 101 due to the lack of interface connectivity between RNCs 121 and 123. In order to avoid this inefficiency, the UE intentionally does not perform the connection recovery procedure based on the information it has collected on the interface connectivity between the RNCs. Instead, UE 101 will immediately initiate the initial connection procedure with RNC 123 to avoid the time that would have been wasted on connection recovery attempts.

Figure 2:
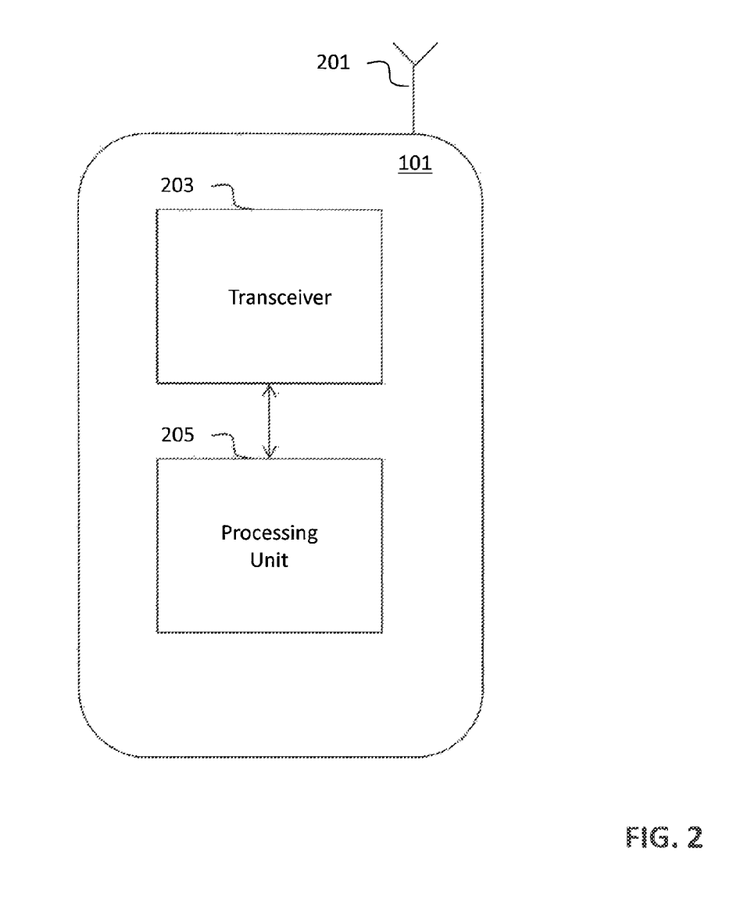
FIG. 2 illustrates a device, in accordance with an embodiment of the present disclosure.

FIG. 2 illustrates a device 101, according to an embodiment of the present disclosure. For example, the device illustrated in FIG. 2 can be implemented as UE 101 of FIG. 1. In one example, UE 101 can include, but is not limited to, transceiver 203 (including a radio transmitter and receiver) and antenna 201, in addition to other modules, all of which can be executed utilizing one or more processors, such as processing unit 205. According to one example, UE 101 is configured to use transceiver 203 and antenna 201 for communication with BS 113.

According to one example, UE 101 is configured to collect information regarding the cell areas around UE 101 and RNCs associated with the cell areas using antenna 201 and is configured to analyze the information using, for example, processing unit 205. In this example, UE 101 is configured to determine whether RNCs associated with the surrounding cell areas have interface connectivity and use this information to determine whether to perform connection recovery procedure when UE 101 experiences radio link failure. According to one embodiment, processing unit 205 of UE 101 is configured to perform one or more of the determinations discussed above.

Figure 3:
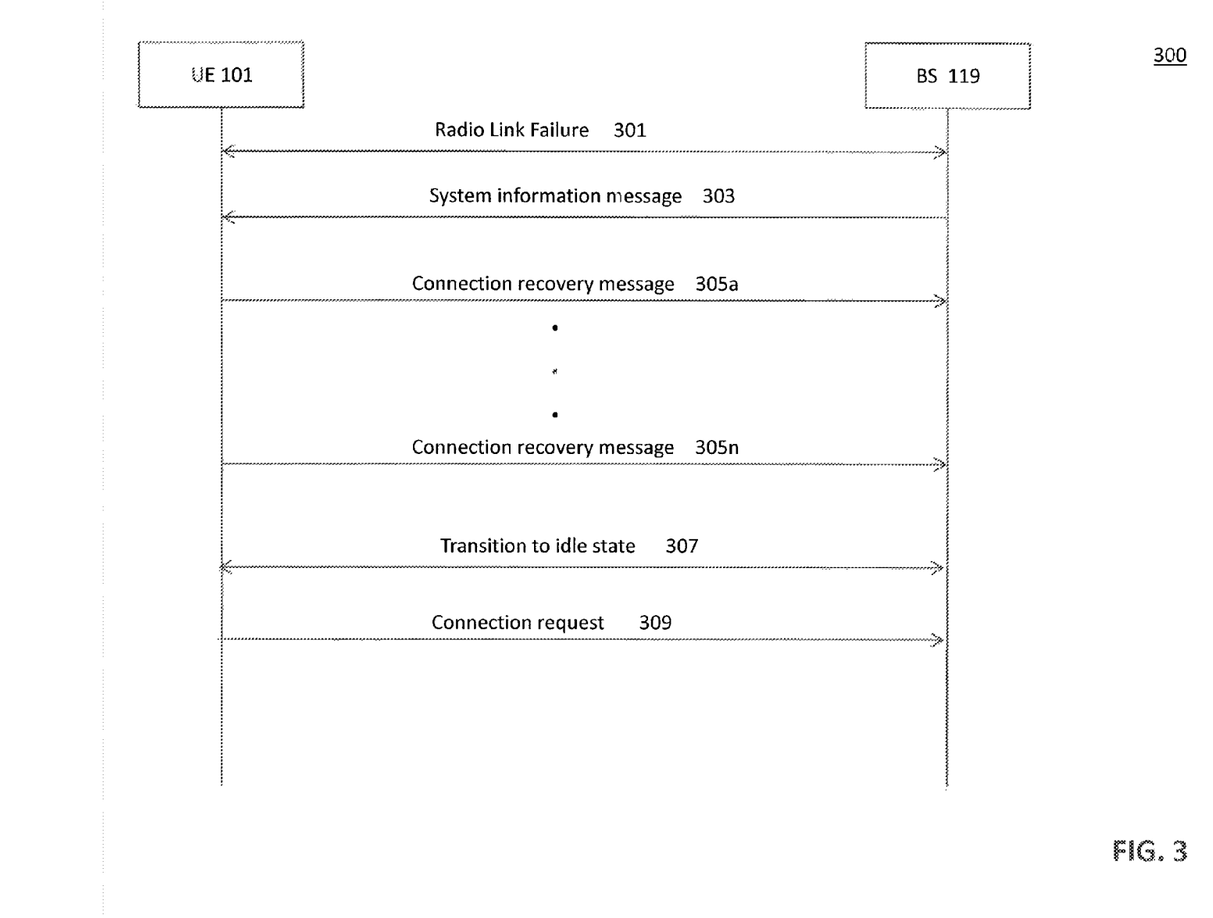
FIG. 3 illustrates a timing diagram, in accordance with a conventional method.

FIG. 3 illustrates a timing diagram, in accordance with a conventional method that is provided for comparison purposes. According to this example, UE 101 has a connection with BS 113 and RNC 121. At 301, UE 101 experiences a radio link failure with BS 113 and RNC 121. For example, the radio link failure can occur because UE 101 has moved, and is now in the coverage area of BS 119. However, other radio link failures can occur as will be understood by those skilled in arts. According to this example, now UE 101 is in the coverage area of BS 119, which is controlled by RNC 123. In this conventional example, UE 101 does not have the information that RNCs 121 and 123 do not have interface connectivity between them.

In this conventional example, BS 119 sends an information message 303, such as system information message, to UE 101, which can include different information, such as an identifier of cell area 109 associated with BS 119, information about BS 119, information about RNC 123 (such as an identifier of cell 123), and the like. In this conventional example, UE 101 will start connection recovery procedure by sending out connection recovery messages 305*a*-305*n*, such as cellUpdate messages. Depending on network configuration and requirements, UE 101 has to send a number of connection recovery messages 305a-305n and there is a defined time interval between each of the messages. In one conventional example, UE 101 needs to send 7 connection recovery messages with 8 seconds between them.

In this conventional example, connection recovery messages 305a-305n include an identifier associated with UE 101, which is allocated to UE 101 by the prior serving RNC 121. Since RNC 123 that controls BS 119 does not recognize UE 101 (for example, does not recognize the identifier of UE 101 and there is no interface connectivity between RNCs 121 and 123), RNC 123 and BS 119 do not respond to UE 101's connection recovery messages 305a-305n. In this conventional example RNC 123 does not recognize UE 101 because RNC 123 does not recognize UE 101's identifier, which is assigned to UE 101 by RNC 121 and there is no interface connectivity between RNCs 121 and 123, precluding notification of by RNC 121 to RNC 123 of the UE information. When the required number of transmissions and re-transmission is passed, UE 101 will transition to idle state in 307. After which, UE 101 will start establishing an initial connection procedure with BS 119 and RNC 123 by sending an initial connection request 309, including RAU and LAU procedures so as to introduce itself to the new RNC.

Figure 4:
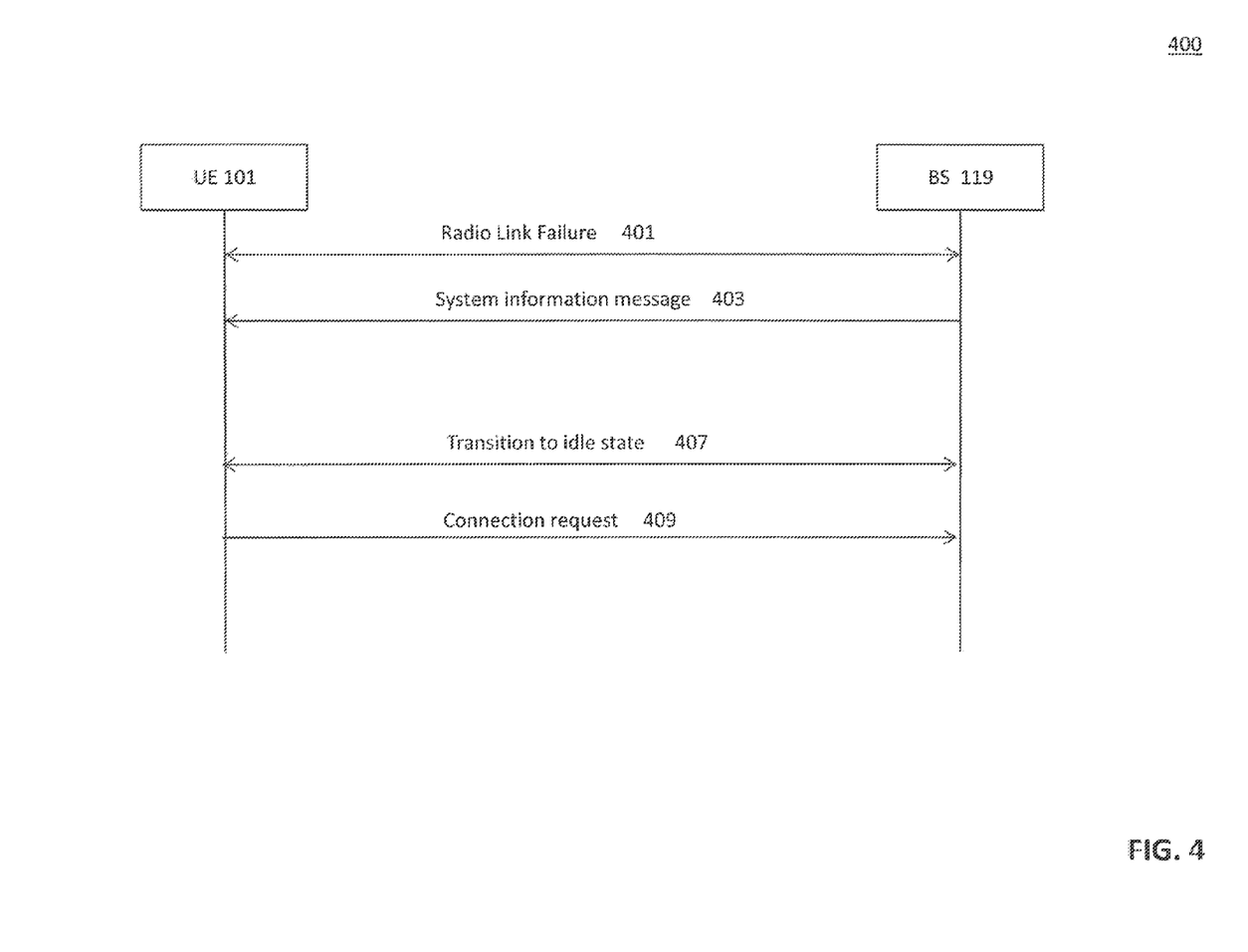
FIG. 4 illustrates a timing diagram, in accordance with an embodiment of the present disclosure.

FIG. 4 illustrates a timing diagram, in accordance with an embodiment of the present disclosure. According to this example, UE 101 has a connection with BS 113 and RNC 121. At 401, UE 101 experiences a radio link failure with BS 113 and RNC 121. In one example, the radio link failure can be because UE 101 has moved and is now in the coverage area of BS 119. However, radio link failure could occur for other reasons as will be understood by those skilled in the art. According to this example, now UE 101 is in the coverage area of BS 119, which is controlled by RNC 123. In this example, UE 101 has the information that RNCs 121 and 123 do not have interface connectivity between them.

In this example, BS 119 sends an information message 403, such as a system information message, to UE 101, which can include information, such as an identifier of cell area 109 associated with BS 119, information about BS 119, information about RNC 123 (such as the identifier of RNC 123), and the like. This information message 403 could be periodically broadcast by BS 119 for any UE in its coverage area to receive. In this example, since UE 101 has the information that RNCs 121 and 123 do not have interface connectivity between them and UE 101 also knows that it is in a new cell associated with RNC 123, UE 101 will not perform the connection recovery procedure, such as connection recovery procedure using connection recovery messages 305a-305n of FIG. 3.

Instead, UE 101 will immediately transition to idle state in 407, and will start establishing an initial connection procedure with BS 119 and RNC 123 by sending an initial connection request 409. Initial connection request 409 can be defined based on the network configuration and the specific standard used in system 100 of FIG. 1. According to one example initial connection request 409 can include rrcConnectionrequest message as defined in 3GPP standards. Accordingly, UE 101 can save the time that would have been wasted in connection recovery procedure, such as connection recovery procedure using connection recovery messages 305a-305n of FIG. 3.

Figure 5:
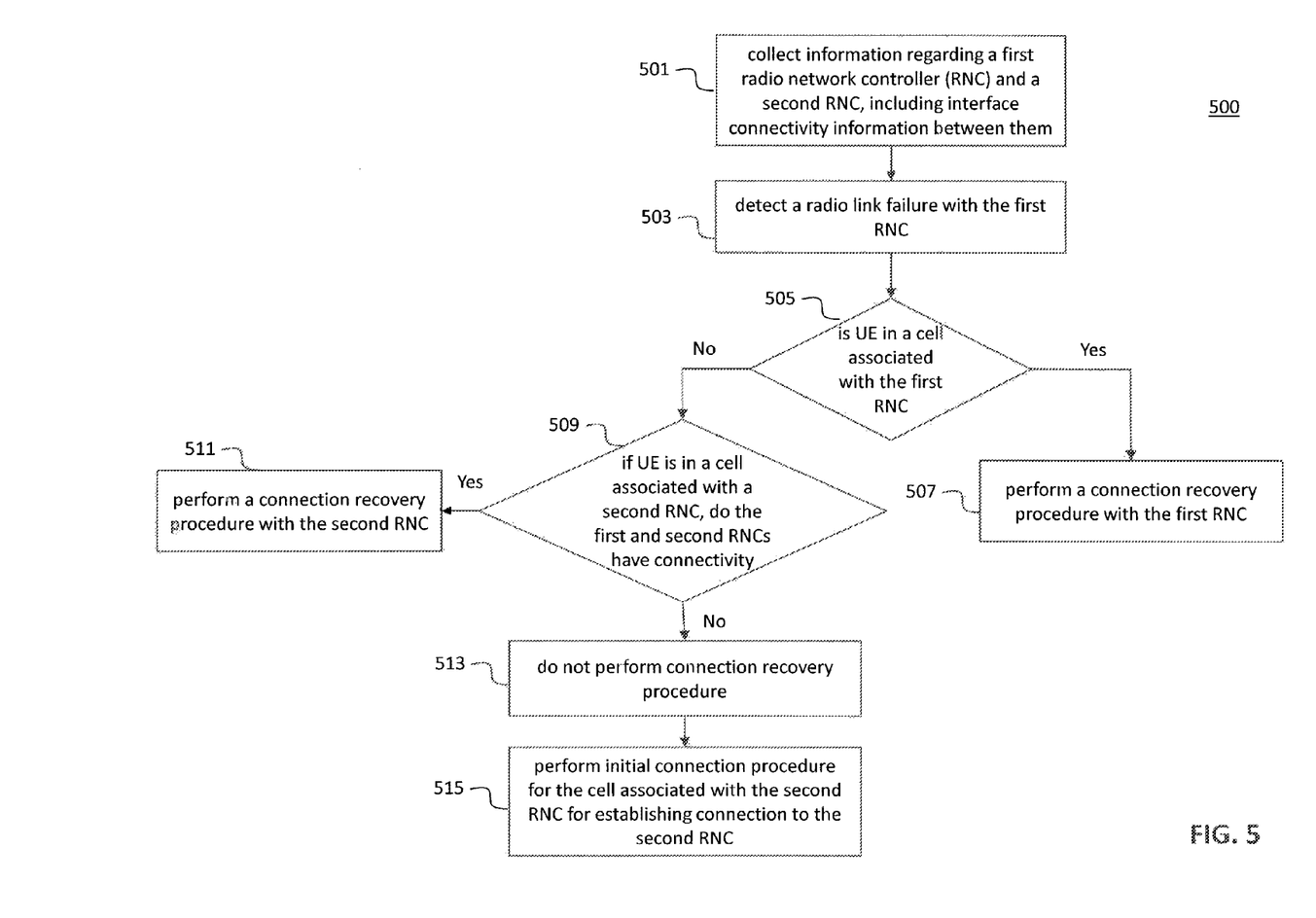
FIG. 5 is a flowchart illustrating a method, in accordance with an embodiment of the present disclosure.

FIG. 5 is a flowchart illustrating a method, in accordance with an embodiment of the present disclosure. For example, method 500 can be performed by UE 101. It is to be appreciated not all steps may be needed to perform disclosure provided herein. Further, some of the steps may be performed simultaneously, or in a different order than that shown in FIG. 5, as will be understood by those skilled in the art. Reference is made to UE 101 in FIG. 1 merely for convenience of discussion. Other systems may be used to perform the method as will be understood by those skilled in the arts.

In step 501, UE 101 collects information regarding the first and second RNCs, as discussed above. This information can include, but is not, limited to, interface connectivity information between the two RNCs, or information that can be used to determine if there is interface connectivity between first and second RNCs. As one example discussed above, the inability of two RNCs to perform a hand-over during a regular connected mode, can be used by the UE to conclude that there is no interface between the RNCs.

In step 503, UE 101 detects that its radio link with a first NC, such as RNC 121 has failed. According to this example, UE 101, which was located in cell area 103, had a connection with RNC 121 through BS 113. In this example, UE 101 can detect when its radio connection with RNC 121 fails.

In step 505, UE 101 can determine whether UE 101 is in a cell that is still associated with the first RNC or it is now located in a cell that is associated with a second RNC. For example, UE 101 can detect whether it has moved to cell 109 associated with RNC 123. According to one example, the determination in step 505 can include receiving an information message from the RNC or a BS associated with the RNC. UE 101 can examine the information message and determine the RNC identifier, the cell identifier, and/or other information to determine whether it is still in the cell associated with the first RNC or a new second RNC, or both. Alternatively, integrated GPS functionality within the UE can be leveraged to determine relative location, and therefore the serving RNC.

If UE 101 determines that it is still located in a cell area that is associated with the first RNC (for example in cell area 103 or 105), in step 507, UE 101 can perform the connection recovery procedure with the first RNC to recover its radio link with RNC 121. For example, the connection recovery procedure defined by 3GPP can be utilized to recover the network connection.

If UE 101 determines that it is not located in the cell associated with the first RNC (for example, UE 101 receives the information message from the second RNC including the second RNC identifier and/or its cell's identifier), in step 509, UE 101 determines whether the first and second RNCs have interface connectivity. As discussed above, and according to on example, UE 101 has collected, a priori, information regarding the interface connectivity of RNCs during its operation, for example, in step 501. If UE 101 determines that the first and second RNCs have interface connectivity between them, UE 101 can perform connection recovery procedure to recover its radio link now with RNC 123, in step 511. According to this example, since the first and second RNCs have interface connectivity, the second RNC (which now receives connection recovery request message from UE 101) can confirm the identity of UE 101 with the first RNC. Further the second RNC can receive and confirm with the first RNC, the UE 101's connection information with the first RNC. Therefore, the second RNC can re-connect UE 101 using the connection recovery procedure.

However, if UE 101 determines that the first and second RNCs do not have interface connectivity between them, in step 513, UE 101 will not perform the connection recovery procedure. Instead, in step 515, UE will perform initial connection procedure with the second RNC (for example RNC 123 of FIG. 1), which has no interface connectivity with RNC 121, to establish an initial connection with the second RNC.

Steps 513-515 bypass the connection recovery procedure, and therefore avoid the time that would have been wasted in repeatedly sending connection recovery messages that will not be responded to by the second RNC. Accordingly, overall connection recovery time is reduced.

Figure 6:
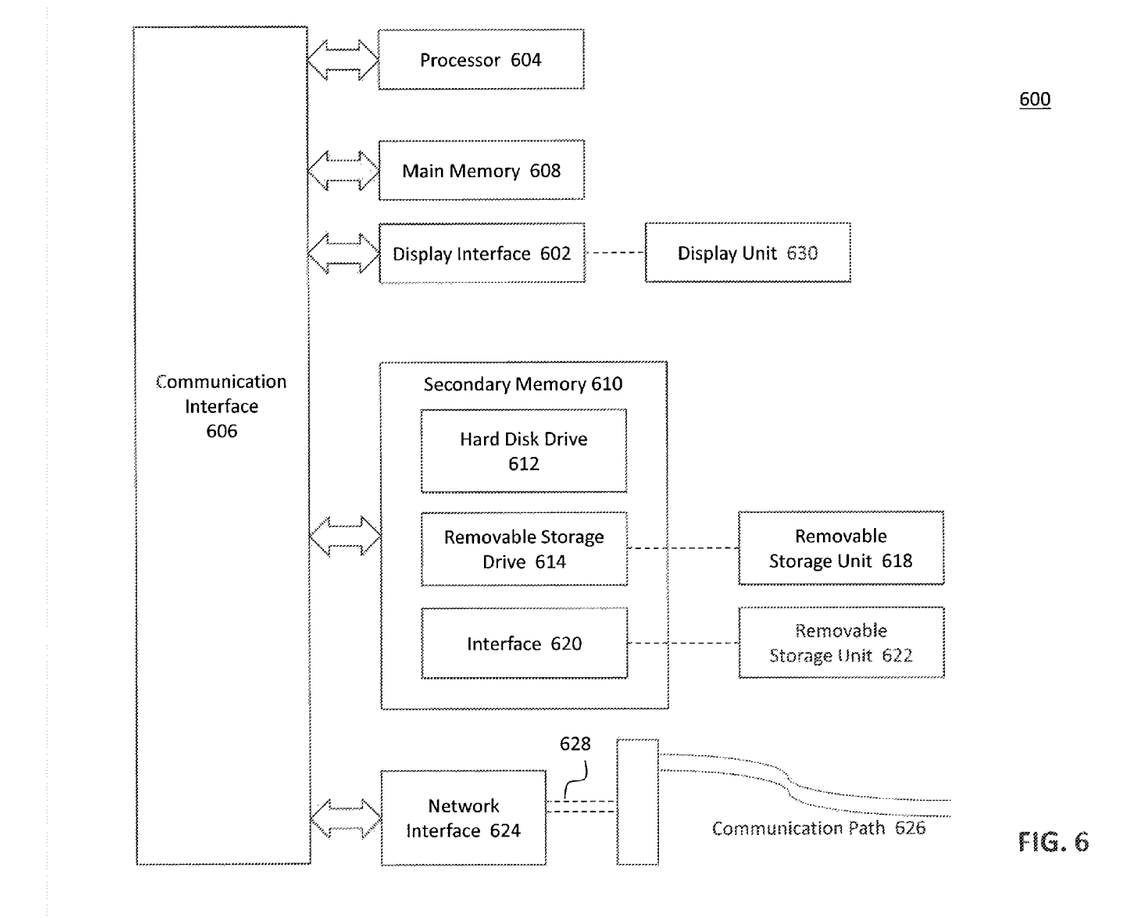
FIG. 6 illustrates a computer system that can be utilized to implement one or more embodiments of the present disclosure.

Various aspects of the present disclosure can be implemented by software, firmware, hardware, or a combination thereof FIG. 6 illustrates an example computer system 600 in which the present disclosure, or portions thereof, can be implemented as computer-readable code. For example, method 500 can be implemented by computer system 600. Various embodiments of the disclosure are described in terms of this example computer system 600. After reading this description, it will become apparent to a person skilled in the relevant art how to implement the disclosure using other computer systems and/or computer architectures.

Computer system 600 includes one or more processors, such as processor 604. Processor 604 can be a special purpose or a general purpose processor. Processor 604 is connected to a communication infrastructure 606 (for example, a bus or network).

Computer system 600 also includes a main memory 608, preferably random access memory (RAM), and may also include a secondary memory 610. Secondary memory 610 may include, for example, a hard disk drive 612, a removable storage drive 614, and/or a memory stick. Removable storage drive 614 may comprise a floppy disk drive, a magnetic tape drive, an optical disk drive, a flash memory, or the like. The removable storage drive 614 reads from and/or writes to a removable storage unit 618 in a well-known manner. Removable storage unit 618 may comprise a floppy disk, magnetic tape, optical disk, etc. that is read by and written to by removable storage drive 614. As will be appreciated by persons skilled in the relevant art(s), removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video, game devices), a removable memory chip (such as an EPROM, or PROM) and associated socket, and other removable storage units 622 and interfaces 620 that allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 are in the form of signals that may be electronic, electromagnetic, optical, or other signals capable of being received by communications interface 624. These signals are provided to communications interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. Signals carried over communications path 626 can also embody the logic described herein. Computer program medium and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in, main memory 608 and/or secondary memory 610. Computer programs may also be received via communications interface 624. Such computer programs, when executed, enable computer system 600 to implement the present disclosure as discussed herein. In particular, the computer programs, when executed, enable processor 604 to implement the processes of the present disclosure. Accordingly, such computer programs represent controllers of the computer system 600. Where the disclosure is implemented using software, the software may be stored in a computer program product and loaded into computer system 600 using removable storage drive 614, interface 620, hard drive 612 or communications interface 624.

The disclosure is also directed to computer program products comprising software stored on any computer useable medium. Such software, when executed in one or more data processing device, causes a data processing device(s) to operate as described herein. Embodiments of the disclosure employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired, and wireless communications networks, local area networks, wide area networks, intranets, etc.).

CONCLUSION

The exemplary embodiments described herein are provided for illustrative purposes, and are not limiting. Other exemplary embodiments are possible, and modifications may be made to the exemplary embodiments within the spirit and scope of the disclosure.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail of the disclosure can be made therein without departing from the spirit and scope of the disclosure. Thus the disclosure should not be limited by any of the above-described exemplary embodiments. Further, the claims should be defined only in accordance with the following recitations and their equivalents.

What is claimed is:

1. A method, comprising:
   detecting, by a user equipment (UE), a radio link failure to a first radio network controller (RNC);

receiving an information message from a second RNC;
determining whether the first and second RNCs have interface connectivity between them;
performing a connection recovery procedure with the second RNC, when the first and second RNCs have interface connectivity between them; and
performing an initial connection procedure to establish a connection with the second RNC without performing a connection recovery procedure beforehand, when the first and second RNCs do not have interface connectivity between them,
wherein the initial connection procedure is performed using the information message.

2. The method of claim 1, wherein the information message includes information regarding the second RNC and information regarding a cell area associated with the second RNC.

3. The method of claim 2, further comprising:
determining that the UE is located in the cell area associated with the second RNC.

4. The method of claim 1, wherein the performing a connection recovery procedure with the second RNC includes sending one or more connection recovery messages to a base station (BS) associated with the second RNC.

5. The method of claim 1, further comprising:
collecting information regarding the first and second RNCs, including interface connectivity information between the first and second RNCs, before the detecting a radio link failure.

6. The method of claim 1, wherein the performing an initial connection procedure to establish a connection with the second RNC includes performing location area update (LAU) and routing area update (RAU) for a cell associated with the second RNC.

7. The method of claim 1, further comprising:
transitioning to an idle state before the performing an initial connection procedure to establish a connection with, the second RNC.

8. An apparatus, comprising:
a radio transceiver configured to receive and transmit signals to a first radio network controller (RNC); and
a processing unit configured to:
detect a radio link failure to the first RNC;
receive an information message from a second RNC;
determine whether the first and second RNCs have interface connectivity between them;
if the first and second RNCs have interface connectivity between them, perform a connection recovery procedure with the second RNC; and
if the first and second RNCs do not have interface connectivity between them, perform an initial connection procedure to establish a connection with the second RNC without performing a connection recovery procedure beforehand,
wherein the initial connection procedure is performed using the information message.

9. The apparatus of claim 8, wherein the information message includes information regarding the second RNC and information regarding a cell area associated with the second RNC.

10. The apparatus of claim 9, wherein the processing unit is further configured to determine that the apparatus is located in the cell area associated with the second RNC.

11. The apparatus of claim 8, wherein the performing a connection recovery procedure with the second RNC includes sending one or more connection recovery messages to a base station (BS) associated with the second RNC.

12. The apparatus of claim 8, wherein the processing unit is further configured to collect information regarding the first and second RNCs, including interface connectivity information between the first and second RNCs, before the detecting a radio link failure.

13. The apparatus of claim 8, wherein the performing an initial connection procedure to establish a connection with the second RNC includes performing location area update (LAU) and routing area update (RAU) for a cell associated with the second RNC.

14. The apparatus of claim 8, wherein the processing unit is further configured to transition the apparatus to an idle state before the performing an initial connection procedure to establish a connection with the second RNC.

15. An article of manufacture including a non-transitory computer-readable storage medium having instructions stored thereon, execution of which by a computing device causes the computing device to perform operations comprising:
detecting a radio link failure to a first radio network controller (RNC);
receiving an information message from a second RNC;
determining whether the first and second RNCs have interface connectivity between them;
performing a connection recovery procedure with the second RNC, when the first and second RNCs have interface connectivity between them; and
performing an initial connection procedure to establish a connection with the second RNC without performing a connection recovery procedure beforehand, when the first and second RNCs do not have interface connectivity between them,
wherein the initial connection procedure is performed using the information message.

16. The article of manufacture of claim 15, wherein the information message includes information regarding the second RNC and information regarding a cell area associated with the second RNC.

17. The article of manufacture of claim 15, wherein the performing a connection recovery procedure with the second RNC includes sending one or more connection recovery messages to a base station (BS) associated with the second RNC.

18. The article of manufacture of claim 15, wherein the operations further comprise:
collecting information regarding the first and second RNCs, including interface connectivity information between the first and second RNCs, before the detecting a radio link failure.

19. The article of manufacture of claim 15, wherein the performing an initial connection procedure to establish a connection with the second RNC includes performing location area update (LAU) and routing area update (RAU) for a cell associated with the second RNC.

20. The article of manufacture of claim 15, wherein the operations further comprise:
transitioning to an idle state before the performing an initial connection procedure to establish a connection with the second RNC.

* * * * *